Aug. 31, 1943.  Z. Y. KUO  2,328,347
PROCESS OF INCUBATION OF EGGS
Filed Aug. 12, 1939
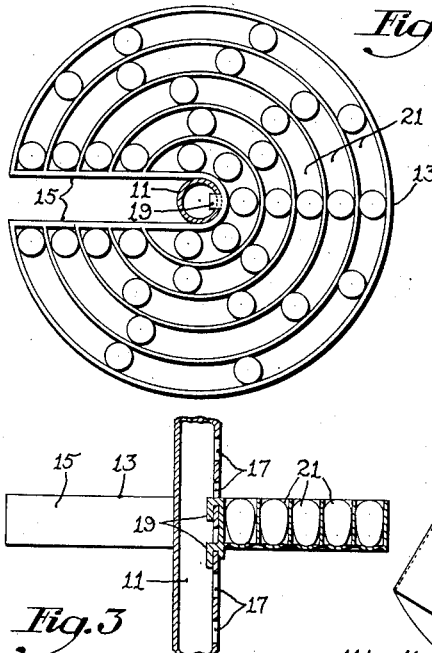
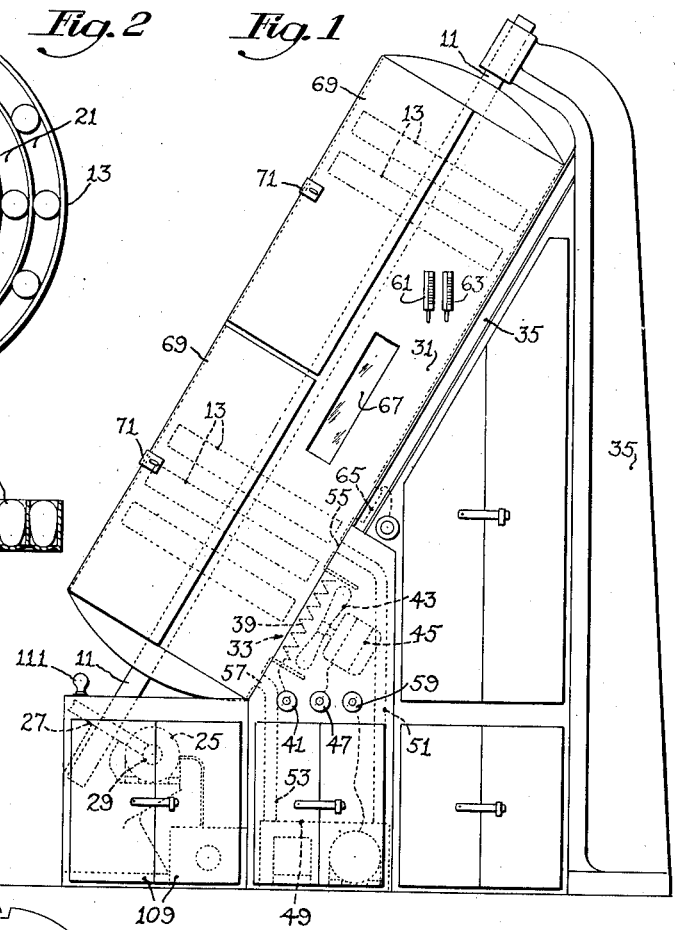
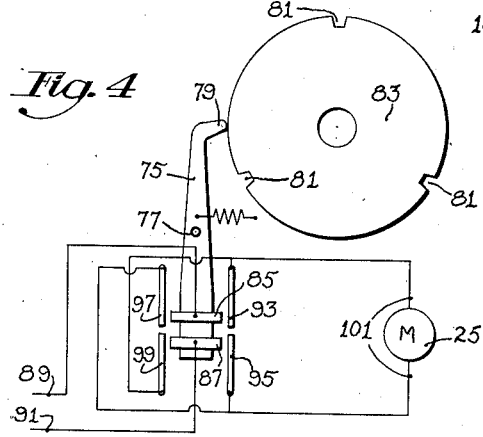
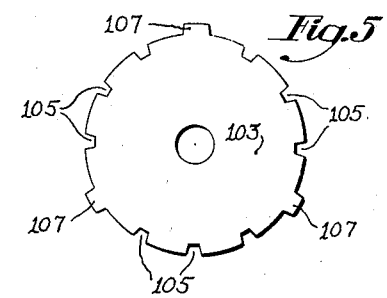
Witness
H. E. Van Dine
Inventor
Zing Yang Kuo
by his attorneys
Fish, Hildreth, Cary & Jenney Patented Aug. 31, 1943

2,328,347

UNITED STATES PATENT OFFICE 2,328,347

PROCESS OF INCUBATION OF EGGS

Zing Yang Kuo, Boston, Mass.

Application August 12, 1939, Serial No. 289,912

10 Claims. (Cl. 119—44)

The present invention relates to the incubation of eggs, and more particularly to a method whereby the eggs may be so turned or manipulated that a substantially higher percentage of hatching may be obtained as compared with the results secured from present methods and apparatus.

It is an established fact that the embryo, as it normally reposes at the top of the egg, will be positioned with the head to the left, viewing the egg from the large end, with its longitudinal axis horizontal. With this fact in mind, I have developed the following described process and apparatus which turns and manipulates the eggs in a manner especially advantageous for embryos thus positioned.

In the fertile egg, the embryo lies upon the yolk body, which it gradually absorbs during growth. The embryo normally tends to rise to the top of the egg, particularly during the first half of the incubation period, and it is well settled that such movement is very desirable, resulting in a much higher percentage of hatching than where the eggs remain quiescent. It is the common practice in incubators, as at present constructed, to provide for the turning or tilting of the eggs at more or less frequent intervals in order to cause such displacement of the embryo and to produce this advantageous return movement.

Heretofore, such movement of the egg has been effected by tilting the egg trays alternately first in one direction and then in the other, to turn or tilt the eggs so that the embryo will be displaced from its original position at the top of the egg to a point beneath, or carried alternately first to one side and then to the other, the longitudinal axis of the egg at such times being ordinarily horizontally disposed.

I have discovered that by this method of tilting, the original position of the embryo will be distorted and in many cases the embryo may die due to twisting or rupturing of blood vessel or yolk sac.

I have also found that by including the longitudinal axis of the egg at an angle to the horizontal, with the large end elevated, and rotating the eggs about such inclined longitudinal axis and controlling the direction and extent and time interval of such rotation of the egg, particularly during the early stages of incubation, this possibility of injury to and death of the embryo will be greatly reduced so that a very substantially higher percentage of hatchings will be obtained than heretofore attainable with the prior methods and apparatus.

The present invention, therefore, consists in the method of supporting and rotating or turning and manipulating the eggs hereafter described in connection with the accompanying drawing.

In accordance with the present invention, the egg is supported with its longitudinal axis inclined to the horizontal and its large end elevated and during the first stage, comprising the first seven days of incubation, is periodically rotated about its inclined longitudinal axis, but always in a clockwise direction and to an extent varying from approximately thirty to sixty degrees, the time intervals between turnings varying with the extent of the turning, being shorter for the smaller amplitudes of movement, and longer for the larger amplitudes.

For example, if the egg is to be rotated each time through thirty degrees, these turnings should occur every two hours; if, on the other hand, the amplitude of turning is forty degrees, this should be done every three hours. For sixty degrees, there should be a four hour interval.

The time required for the turning movement is not critical, as during this first week of incubation the embryo returns quickly to the top of the egg; i. e., in a very few minutes. I have found that satisfactory results were obtained where the turning was effected in one or two minutes.

This first stage of seven days is the most critical and important portion of the incubation period, and if the eggs with their longitudinal axis inclined to the horizontal and their large ends uppermost are rotated during this period always in a clockwise direction and through amounts not varying substantially from a thirty degree minimum to sixty degree maximum, with intervals approximately those above mentioned, a substantial reduction in mortality will result, ranging from five to ten per cent.

The advantage of inclining the egg with its large end elevated is that it tends to prevent the embryo from falling to the middle or small end of the egg, which may interfere with the hatching in the later stages. In the inclined position the orientation of the head of the embryo is easier to control by proper turning than with horizontal positioning. Also the inclined position keeps the white away from the large end where it might in some later stage interfere with the movements of the embryo in changing its position.

One of the reasons why I believe that the above specified direction, extent and periods of turning during the first seven-day stage reduces the mortality of the embryo is that with the clockwise rotation and with the head positioned to the left, which is the usual position in the large majority of eggs, the embryo will float to the top of the yolk with its head upward, whereas if the rotation were counterclockwise, this return movement of the embryo would have to be with the tail upward, which is more difficult, especially from the fifth to the seventh days when the head has grown heavy. Furthermore, there is less liability of the embryo changing its original advantageous position, at least in the large majority of eggs where the head is to the left.

As to the extent of rotation, any turning in excess of substantially sixty degrees requires an excessive return movement of the embryo and may result in a shifting of its original orientation.

The time intervals selected are with a view to giving the embryo a sufficient time to return to the top of the yolk, and while these intervals may be substantially longer than required during the first days of this first stage, a three-day embryo, for example, ordinarily floating back to the top of the yolk within a few minutes after the turning, this extended period affords ample time for such return during the last day of the stage, when the return movement is very much slower.

The traveling of the embryo from other parts of the egg to the top of the yolk is effected in the early days by the movement or floating of the entire yolk sac, the embryo remaining passive, but as the embryo absorbs its nutrition from the yolk and becomes larger and heavier and the yolk smaller, the amnion enclosing the embryo contracts and such contraction during the later days of this first stage, such as the sixth and seventh days, is chiefly responsible for sending the embryo back to the top of the egg after the turning. If, however, such turning had placed the embryo in an unfavorable position as, for example, by counterclockwise rotation or an excessive extent of rotation as by the present method of tilting, this contraction of the amnion may be insufficient to return the embryo to the top of the yolk, or at least may retard it greatly.

The most favorable conditions for the return of the embryo to the top of the yolk are, as above set forth, where the rotation is clockwise and the extent is from approximately thirty to sixty degrees, and the interval from two to four hours, and it is by maintaining these optimum conditions that the minimum mortality in the embryo at this stage is obtained.

During the second stage of my improved method of incubation, several alternative series of steps may be adopted. A first alternative for the second seven-day stage is to permit the egg to remain quiescent with no turning whatsoever for the eighth and ninth days. During this two-day period, the contractions of the amnion are most violent and additional movement of the embryo from turning or rotation of the egg is not necessary.

Beginning with the tenth day, the egg may be turned alternately clockwise and counterclockwise during the remainder of the second week. The purpose of these turnings or rotations is to keep the yolk from adhering and becoming fixed, particularly during the tenth and eleventh days when the contractions of the amnion diminish greatly. Also to assist or facilitate movement of the much reduced yolk sac in rising and folding over the abdomen of the embryo.

A second alternative for this period is to turn the egg first 90° in a counterclockwise direction, then 45° in a clockwise direction, and finally another 45° in the clockwise direction.

The third alternative is first to turn the egg 90° in a counterclockwise direction, and then to return it to its original position in three steps of 30° each in a clockwise direction.

The reason for turning the egg more in the counterclockwise direction than in the clockwise direction during this second week is to prevent the head of the embryo from shifting to the small end of the egg and also prevent the head from falling on its side or on the abdomen. The timing or interval between these various steps in these alternative procedures is not so important during the second as in the first week, because there is very little possibility of the embryo returning to its original place within a few hours after the egg has been turned. It is important, however, that the timing or interval following the counterclockwise turnings be longer than those following the clockwise turning.

It is also important that the clockwise turning does not exceed 60°, for if a greater movement than this is employed, the head of the embryo may shift to the small end of the egg or fall on its side or onto the abdomen. Turning more than 120° counterclockwise is to be avoided, for such an extent of turning may bring the embryo to the bottom of the egg and may shift the body to a wrong position.

Any of the above alternative series of steps for the second week will give substantially the same satisfactory results. If desired, any of these series may be continued until the eighteenth day when, as with the present method, the eggs will be transferred to the hatching trays.

In view of the fact that the mortality of the embryo during this first week is so substantially reduced where the turnings are all clockwise and of restricted amount, I believe that there is some distinct advantage to the embryo in maintaining the head above the tail when the embryo is returning to the top after the egg has been turned.

It is my opinion that this reduction in mortality is secured chiefly in those eggs in which the embryo is positioned with its head to the left, which is the normal and usual position, as above explained. As to those eggs in a hatching where the embryo is turned to the right, I believe that my above described method of supporting the eggs in inclined position and of turning and manipulating them probably secures better results than the ordinary method of supporting the eggs with their longitudinal axes horizontal and alternate tilting or turning them in excessive amounts. But be that as it may, the total net result gained by my method is a very substantial reduction in mortality.

While the foregoing described manipulation or turning of the eggs in the process of incubation may be carried out by hand, it obviously may be performed much more expeditiously and economically if accomplished by mechanism which will handle large numbers of eggs at a time and automatically effect the turning at the desired intervals. Accordingly, I have devised an apparatus operating in accordance with my improved process and have illustrated the same in the accompanying drawings in which Fig. 1 is a side elevation of the complete apparatus; Figs. 2 and 3 are enlarged details in top plan and vertical sections respectively showing a circular egg tray and method of attachment to the tubular actuating shaft; Fig. 4 is a diagrammatic detail illustrating the automatic control of the motor for rotating such shaft equipped with a control disk designed for use during the first week of incubation; and Fig. 5 shows a controlling disk suitable for use during the second week of the incubation period.

As illustrated in the drawing, my improved apparatus comprises an inclined shaft adapted to support transversely thereon a series of circular egg trays and arranged to be rotated at stated intervals through the desired portion of a revolution by an intermittently operating electric motor. This motor is automatically controlled to start and stop and to turn in the desired direction at predetermined times and to predetermined degrees by interchangeable control disks for closing and opening and reversing suitable switch mechanisms for the motor. The shaft with the egg trays mounted thereon is positioned within a cylindrical casing and means are provided for supplying and regulating heat for incubation as well as the proper humidity, all under the control of the usual thermometers, thermostats, etc.

Referring to Figs. 1, 2 and 3 of the drawing, a hollow actuating shaft 11 is mounted at an angle of approximately 30° with the vertical in fixed bearings at the upper and the lower ends of the shaft. Upon this shaft 11 are mounted the circular egg trays 13 formed as shown in Fig. 2 with the open notch or recess 15 to permit the trays to be mounted upon and removed from the shaft 11. A convenient form of mounting is shown in Figs. 2 and 3 where the tubular shaft 11 is provided with a series of spaced openings or slots 17 adapted to receive the hooks or bent over members 19 which are first passed through the openings or slots and then moved downwardly into locking position, as shown in Fig. 3.

Preferably, the circular egg trays are provided with a series of circular partitions 21 to facilitate the placing of the eggs in the trays and to retain the eggs in the desired position which is with the large end uppermost.

This shaft 11, carrying its series of egg trays 13, is rotated by means of the motor 25 through pinion 27 and worm 29 whereby the relatively slow turning movement is secured.

The rotating shaft, with its supported egg trays, is enclosed within a fixed circular casing 31 with closed ends and sides, except for a portion of the side wall adjacent the bottom end of the casing where such side wall is omitted, indicated generally at 33. This casing, which is stationary, is supported on a suitable framework 35 which also comprises the support or standard for the upper bearing of the rotating shaft.

Opposite the open portion of the wall of the casing is located the electrical heating element 39 having a suitable switch 41 on the outside of the base.

Adjacent the heating unit is the ventilating fan 43 driven by the motor 45 and controlled from the switch 47.

Humidified air is supplied from suitable humidifying apparatus 49 in the base of the apparatus through supply and return ducts 51 and 53 respectively with inlet and exhaust openings 55 and 57 opposite the opening 33 in the side wall of the casing. A switch 59 controls the operation of the humidifier. The temperature and humidity in the casing are indicated by a suitable thermometer 61 and humidistat 63 and the thermostat 65 provides an automatic control of the heating element 39. The windows 67 filled with glass or other transparent material afford a view of the interior of the casing near the middle thereof.

Access to the interior of the casing for the purpose of inserting and removing the egg trays is afforded by means of the two pairs of hinged doors 69 with suitable clasps or other fastener devices 71. The rotation of the driving motor 25 for turning the shaft and trays both as to the direction and extent of operation is controlled by means of the switch mechanism indicated at Fig. 4 which in turn is controlled by the rotating disk for actuating the switch. The switch comprises the pivoted arm or cam lever 75 pivoted intermediate its length at 77 and having the contact extension 79 at its upper end to engage the cam faces or notches 81 on the disk 83 and carrying at its lower end the two contact members 85 and 87 which are connected in suitable manner with the supply or line wires 89 and 91 respectively. Two pairs of fixed contacts 93 and 95 for rotation in one direction and 97 and 99 for rotation in the opposite direction are in position to be engaged by the movable contacts 85 and 87 and close the motor circuit 101 to the lead in wires 89 and 91. The disk 83, which is rotated continuously at very slow speed by a separate motor, not shown, i. e., one revolution for each twelve hours, has only the notches 81, of which three are provided so that every four hours, the motor circuit is closed to cause the power motor to operate always in the same direction over a short period of time while the notch is passing beneath the finger 79 of the cam lever. The gearing between the power motor and the shaft carrying the egg trays is such that during this closing of the motor circuit, the shaft and trays will be rotated in a clockwise direction, as heretofore explained, through a distance of 60°.

Disk 83 will be removed at the end of the first week and another disk 103, shown in Fig. 5, will be substituted. This disk, it will be noted, not only has a series of notches 105, but extensions 107. These extensions, it will be noted, actuate the controlling switch to close the right-hand contact 85—93 and 87—95, causing the motor to rotate the shaft and trays in the counterclockwise direction and to an extent preferably in the neighborhood of 90°. After this, the three notches 105 cause rotation in the clockwise direction of approximately 30° each, thus returning the shaft and trays to their original or starting position. Thus the shaft and egg trays will be rotated throughout the second week in the manner heretofore described as the third alternative in the foregoing description.

As shown in Fig. 1, the driving motor and its controls are located in a closed compartment in the base of the apparatus, access being afforded by the hinged doors 109. In a second compartment in the base are located the humidifying apparatus in the lower part and the heater ventilating fan and motor in the upper part. The remaining space beneath the cylindrical casing 31, also closed in with hinged doors, may be utilized for the hatching, the eggs being transferred from the circular egg trays to suitable hatching trays for this purpose.

In order to show at a glance that the apparatus is in operating condition with the source of electric supply in proper operative connection to the various motors and controls, a pilot light 111 is provided on the outside of the base which will be lighted when these operating conditions are fulfilled.

In the operation of my improved incubator, the egg trays are loaded and inserted one at a time in the cylindrical casing, being secured upon the actuating shaft in the manner described. The doors of the casing have been closed and the various switches actuated to render the power motor and its controlling switch operative. For the first week of incubation period, disk 83 will be driven by the control motor and the shaft will be actuated clockwise each four hours, being turned through 60° of rotation.

During this period, the heating unit is in turn under the control of the thermostat and the humidifier is similarly operated and controlled by the humidistat.

At the end of the week, the disk 83 is removed from the control mechanism and disk 103 substituted, and thereafter the shaft is turned every four hours clockwise through 90° of rotating, being returned by a series of counterclockwise movements each hour of 30° each. Disk 103 may be continued in operation, if desired, up to the eighteenth day, when the eggs will be transferred from the circular trays to the hatching trays, freeing the apparatus for another lot of eggs. It will be noted that due to the inclined position of the actuating shaft, and the arrangement of the egg trays thereon, the rotation of the shaft effects a turning or rotation of the eggs about their longitudinal axes, as distinguished from the tipping or tilting of the eggs about their short or transverse axes, as commonly practised in the present types of incubators. In this prior tilting method, the embryo is carried from a position directly above to a position directly below the longitudinal axis of the egg, as distinguished from my method of partial rotation where the embryo is carried from above such axis to one side thereof so that its return movement is definite and predetermined. Furthermore, my method of rotation enables me to control and limit the extent of displacement of the embryo from its top position. Furthermore, I am enabled to turn the eggs always in the same direction, thus insuring during the first week of incubation the maintaining of the embryo in the best position for return to its normal location at the upper part of the egg.

While my improved apparatus is designed primarily to turn and manipulate the eggs in accordance with my improved method, it is obvious that it may be operated according to any of the prior methods merely by substituting control disks of the proper type.

While I have described my method and apparatus as used for the incubation of hens' eggs, it is obvious that they are also adapted for the incubation of the eggs of other kinds and types of fowl by the substitution of the appropriate control disks and where necessary, by changes in the egg trays to accommodate other sizes of eggs.

In the foregoing specification and in the accompanying drawing, I have shown what is now considered to be a preferred form of apparatus for carrying out the present invention, but it is to be understood that the invention, in its broader aspects, is not limited to use with apparatus having the specific details of construction therein described and shown but may be carried out with other forms thereof.

Having thus described the invention, what is claimed is:

1. That step in the process of incubation of eggs which consists in imparting a series of periodic rotational movements to the egg about a longitudinal axis which is inclined to the horizontal and in a clockwise direction viewing the egg from the large end the axis of the egg extending in the same direction as the first mentioned axis, and the large end of the egg being elevated, the extent of each rotational movement being substantially less than a half revolution and such series of rotational movements being continued throughout approximately the first week of the incubation period.

2. That step in the process of incubation of eggs which consists in imparting a series of periodic rotational movements to the egg about a longitudinal axis which is inclined to the horizontal and in a clockwise direction viewing the egg from the large end the axis of the egg extending in the same direction as the first mentioned axis, and the large end of the egg being elevated, the extent of each rotational movement being from 30° to 60° and the movements occurring from two to four hours apart, the series continuing only throughout approximately the first week of the incubation period.

3. That step in the process of incubation of eggs which consists in imparting a series of periodic rotational movements to the egg about a longitudinal axis which is inclined to the horizontal and in a clockwise direction viewing the egg from the large end the axis of the egg extending in the same direction as the first mentioned axis, and the large end of the egg being elevated, the extent of each rotational movement being substantially less than a half revolution and such series of rotational movements being continued throughout approximately the first week of the incubation period, and thereafter imparting rotational movements to the egg periodically at some times in one direction and other times in the other.

4. That step in the process of incubation of eggs which consists in imparting a series of periodic rotational movements to the egg about a longitudinal axis which is inclined to the horizontal and in a clockwise direction viewing the egg from the large end the axis of the egg extending in the same direction as the first mentioned axis, and the large end of the egg being elevated, the extent of each rotational movement being substantially less than a half revolution and such series of rotational movements being continued throughout approximately the first week of the incubation period, and thereafter periodically imparting rotational movements to the egg alternately in opposite directions.

5. That step in the process of incubation of eggs which consists in imparting a series of periodic rotational movements to the egg about a longitudinal axis which is inclined to the horizontal and in a clockwise direction viewing the egg from the large end the axis of the egg extending in the same direction as the first mentioned axis, and the large end of the egg being elevated, the extent of each rotational movement being substantially less than a half revolution and such series of rotational movements being continued throughout approximately the first week of the incubation period, and thereafter imparting to the egg a second series of periodic rotational movements each less than a complete rotation comprising a movement in one direction followed by a plurality of spaced shorter rotational movements in the opposite direction.

6. That step in the process of incubation of eggs which consists in imparting a series of periodic rotational movements to the egg about a longitudinal axis which is inclined to the horizontal and in a clockwise direction viewing the egg from the large end the axis of the egg extending in the same direction as the first mentioned axis, and the large end of the egg being elevated, the extent of each rotational movement being substantially less than a half revolution and such series of rotational movements being continued throughout approximately the first week of the incubation period, and thereafter imparting a second series of periodic rotational movements to the egg, each less than a complete rotation, a rotational movement in one direction being followed by a plurality of spaced shorter rotational movements in the opposite direction to return the egg to its original position.

7. That step in the process of incubation of eggs which consists in elevating the eggs so that their longitudinal axes are inclined at an angle to the horizontal with the larger end upward, and while the eggs are so elevated imparting at the beginning of the incubation period a series of periodic rotational movements to the eggs about their longitudinal axes and in a clockwise direction viewing the eggs from their large ends, the extent of each rotational movement being substantially less than a half revolution.

8. That step in the process of incubation of eggs which consists in elevating the eggs so that their longitudinal axes are inclined at an angle to the horizontal with the larger end upward, and while the eggs are so elevated imparting a series of periodic rotational movements to the eggs about their longitudinal axes and in a clockwise direction viewing the eggs from their large ends, the extent of each rotational movement being substantially less than a half revolution and such series of rotational movements being continued throughout a period of approximately seven days from the beginning of the incubation period, and thereafter imparting rotational movements to the eggs periodically sometimes in one direction and other times in the other direction.

9. That step in the process of incubation of eggs which consists in elevating the eggs so that their longitudinal axes are at an angle to the horizontal with the larger end upward, and while the eggs are so elevated imparting a series of periodic rotational movements to the eggs about their longitudinal axes and in a clockwise direction viewing the eggs from their large ends, the extent of each rotational movement being substantially less than a half revolution and such series of rotational movements being continued through a period of approximately seven days from the beginning of the incubation period, and thereafter periodically imparting rotational movements to the eggs alternately in opposite directions.

10. That step in the process of incubation of eggs which consists in elevating the eggs so that their longitudinal axes are at an angle to the horizontal with the larger end upward, and while the eggs are so elevated imparting a series of periodic rotational movements to the eggs about their longitudinal axes and in a clockwise direction viewing the eggs from their large ends, the extent of each rotational movement being substantially less than a half revolution and such series of rotational movements being continued through a period of approximately seven days from the beginning of the incubation period, and thereafter imparting a second series of periodic rotational movements each less than a complete rotation comprising a movement in one direction followed by a plurality of spaced shorter rotational movements in the opposite direction.

ZING YANG KUO.